United States Patent
Tanaami

(10) Patent No.: US 8,502,914 B2
(45) Date of Patent: Aug. 6, 2013

(54) CIRCUIT-SUBSTRATE SUPPORT STRUCTURE AND IMAGE-ACQUISITION DEVICE

(75) Inventor: Hideo Tanaami, Kanagawa (JP)

(73) Assignee: Sony Corporation, Tokyo (JP)

( * ) Notice: Subject to any disclaimer, the term of this patent is extended or adjusted under 35 U.S.C. 154(b) by 332 days.

(21) Appl. No.: 12/644,737

(22) Filed: Dec. 22, 2009

(65) Prior Publication Data

US 2010/0188565 A1  Jul. 29, 2010

(30) Foreign Application Priority Data

Jan. 27, 2009  (JP) ................... 2009-016011

(51) Int. Cl.
 *H04N 5/225* (2006.01)
(52) U.S. Cl.
 USPC ............... 348/374; 348/373; 348/375
(58) Field of Classification Search
 None
 See application file for complete search history.

(56) References Cited

U.S. PATENT DOCUMENTS

| | | | |
|---|---|---|---|
| 5,032,919 A * | 7/1991 | Randmae .................. | 348/345 |
| 7,839,451 B2 * | 11/2010 | Bleau et al. ............... | 348/373 |
| 7,916,205 B2 * | 3/2011 | Takahashi et al. ......... | 348/345 |
| 2005/0110873 A1 * | 5/2005 | Enomoto .................. | 348/207.99 |
| 2006/0082680 A1 * | 4/2006 | Lee ........................... | 348/372 |

FOREIGN PATENT DOCUMENTS

| | | |
|---|---|---|
| JP | 9-36574 A | 2/1997 |
| JP | 2003-46815 | 2/2003 |
| JP | 2003-224384 A | 8/2003 |
| JP | 2006-261395 | 9/2006 |

OTHER PUBLICATIONS

Japanese Office Action dated Nov. 30, 2010 in corresponding Japanese Application No. 2009-016011.

* cited by examiner

*Primary Examiner* — Luong T Nguyen
(74) *Attorney, Agent, or Firm* — Oblon, Spivak, McClelland, Maier & Neustadt, L.L.P.

(57) ABSTRACT

A circuit-substrate support structure includes a circuit substrate having electronic components mounted thereon, a first substrate-holding member provided at one side edge of the circuit substrate to hold the circuit substrate, a second substrate-holding member provided at the other side edge of the circuit substrate, opposite the one side edge, to hold the circuit substrate, and an elastic member provided together with the second substrate-holding member to hold the circuit substrate by applying elasticity in a surface direction of the circuit substrate.

13 Claims, 9 Drawing Sheets

CIRCUIT-SUBSTRATE SUPPORT STRUCTURE AND IMAGE-ACQUISITION DEVICE

BACKGROUND OF THE INVENTION

1. Field of the Invention

The present invention relates to circuit-substrate support structures and image-acquisition devices.

2. Description of the Related Art

As disclosed in, for example, Japanese Unexamined Patent Application Publication No. 2003-46815, there is known an industrial small video camera device that is installed in a manufacturing line of semiconductor devices etc., to continuously acquire images of parts of the continuously supplied semiconductor devices to be inspected.

The video camera device disclosed in Japanese Unexamined Patent Application Publication No. 2003-46815 includes a multilayer flexible substrate that includes a plurality of substrate portions 51 connected to one another. Intermediate substrate portions are held by positioning members arranged to face each other at both ends and elastic members.

SUMMARY OF THE INVENTION

With the technique disclosed in Japanese Unexamined Patent Application Publication No. 2003-46815, the intermediate substrates are fixed by holding ends of the intermediate substrate portions in the surface direction with the elastic members. However, although this method can prevent the substrates from moving in the surface direction, it is difficult to securely fix the substrates in the direction perpendicular to the surface direction (perpendicular direction).

Therefore, due to variations in the manufacture or due to an impact applied to the camera, the substrates move in the perpendicular direction and are inclined, making it difficult to provide a sufficient clearance between the substrates. This results in a problem in that electronic components disposed on the substrates interfere with each other, increasing the possibility of the occurrence of a failure, such as poor contact, due to the electronic components touching each other, and deteriorating the reliability.

The present invention has been made in view of the above-described problems, and it is desirable to provide a novel and improved circuit-substrate support structure capable of securely holding a circuit substrate having electronic components mounted thereon in a direction perpendicular to the surface direction, and to provide an image-acquisition device.

To overcome the above-described problems, the present invention provides a circuit-substrate support structure including a circuit substrate having electronic components mounted thereon, a first substrate-holding member provided at one side edge of the circuit substrate to hold the circuit substrate, a second substrate-holding member provided at the other side edge of the circuit substrate, opposite the one side edge, to hold the circuit substrate, and an elastic member provided together with the second substrate-holding member to hold the circuit substrate by applying elasticity in a surface direction of the circuit substrate.

The second substrate-holding member may have an engaging hole that receives the side edge of the circuit substrate, and the elastic member may hold an end of the circuit substrate projecting from the engaging hole.

The second substrate-holding member may have an engaging portion to be engaged with the elastic member, and the engaging portion may couple the second substrate-holding member and the elastic member.

The first substrate-holding member may have a holding groove that receives the circuit substrate.

To overcome the above-described problems, the present invention also provides an image-acquisition device including a multilayer substrate including a plurality of circuit substrates arranged to face one another, an image-acquisition device mounted on the circuit substrate positioned at an end of the plurality of circuit substrates in a stacking direction to form an image of a subject, a first substrate-holding member provided at one side edge of the multilayer substrate to hold the circuit substrates, a second substrate-holding member provided at the other side edge of the multilayer substrate, opposite the one side edge, to hold the circuit substrates, and an elastic member provided together with the second substrate-holding member to hold the circuit substrates by applying elasticity in a surface direction of the circuit substrates.

The second substrate-holding member may have an engaging hole that receives the side edges of the circuit substrates, and the elastic member may hold ends of the circuit substrates projecting from the engaging hole.

The second substrate-holding member may have an engaging portion to be engaged with the elastic member, and the engaging portion may couple the second substrate-holding member and the elastic member.

The first substrate-holding member may have holding grooves that receive the circuit substrates.

According to the present invention, it is possible to securely hold a circuit substrate having electronic components mounted thereon in a direction perpendicular to a surface direction.

DESCRIPTION OF THE PREFERRED EMBODIMENTS

Figure 1:
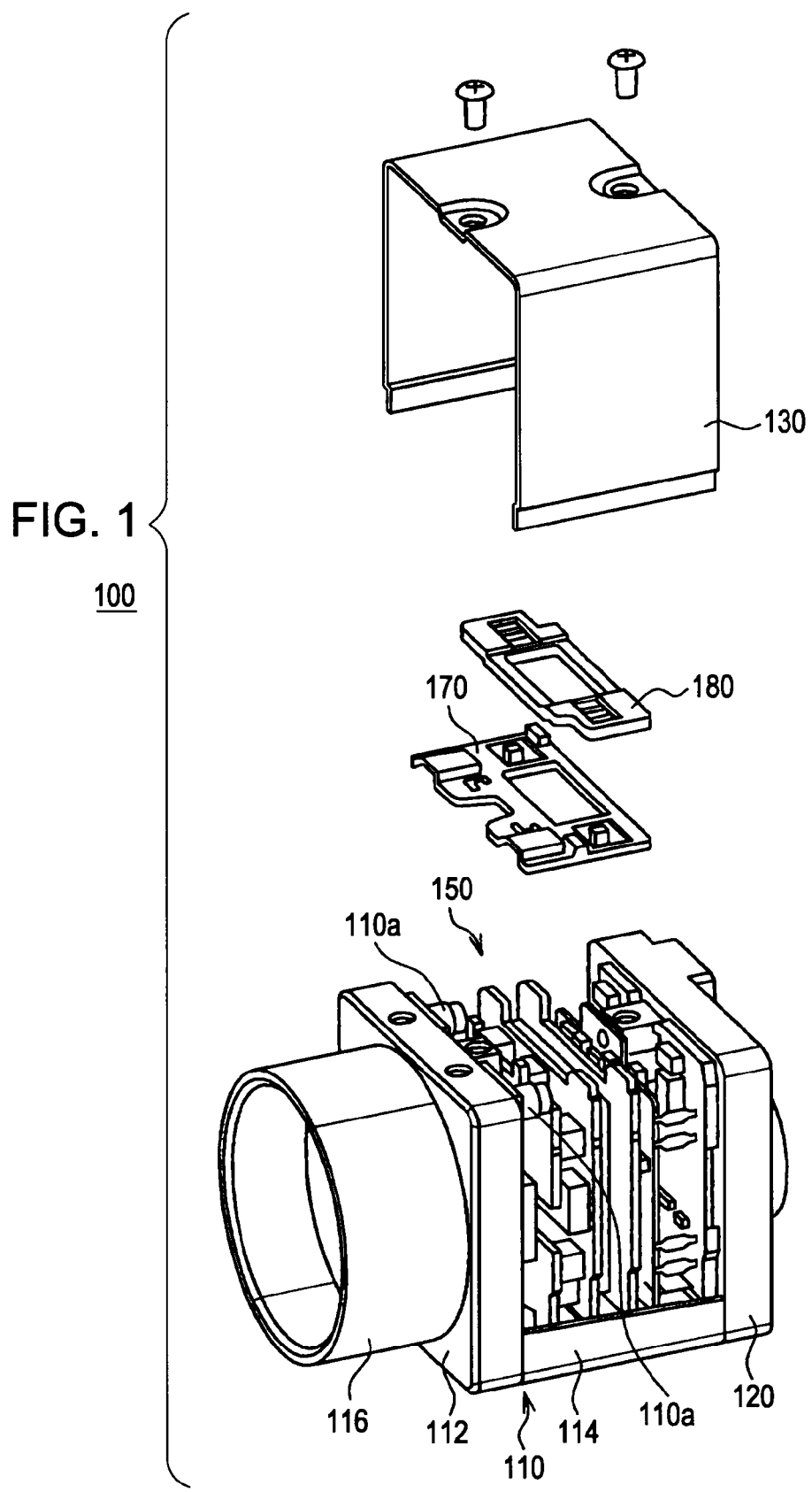
FIG. 1 is an exploded perspective view for describing the structure of an image-acquisition device according to an embodiment of the present invention.

Referring to attached drawings, a preferred embodiment of the present invention will be described in detail below. In the description and drawings, components having substantially the same functions and structures will be denoted by the same reference numerals, and repetitive descriptions will be omitted. The descriptions will be given in the following order:

1. The Structure of the Image-Acquisition Device according to an Embodiment of the Present Invention
2. The Structure of the Multilayer Flexible Substrate
3. The Multilayer-Flexible-Substrate Support Structure at the Bottom of the Casing
4. The Multilayer-Flexible-Substrate Support Structure at the Top of the Casing 1. The Structure of the Image-Acquisition Device According to an Embodiment of the Present Invention FIG. 1 is an exploded perspective view for describing the structure of an image-acquisition device 100 according to an embodiment of the present invention. The image-acquisition device 100 is installed in, for example, an inspection unit of an electronic-component mounting apparatus or a semiconductor manufacturing apparatus. The image-acquisition device 100 detects the positions of fine products being supplied or acquires the images of the products to determine the quality of the products.

Figure 2:
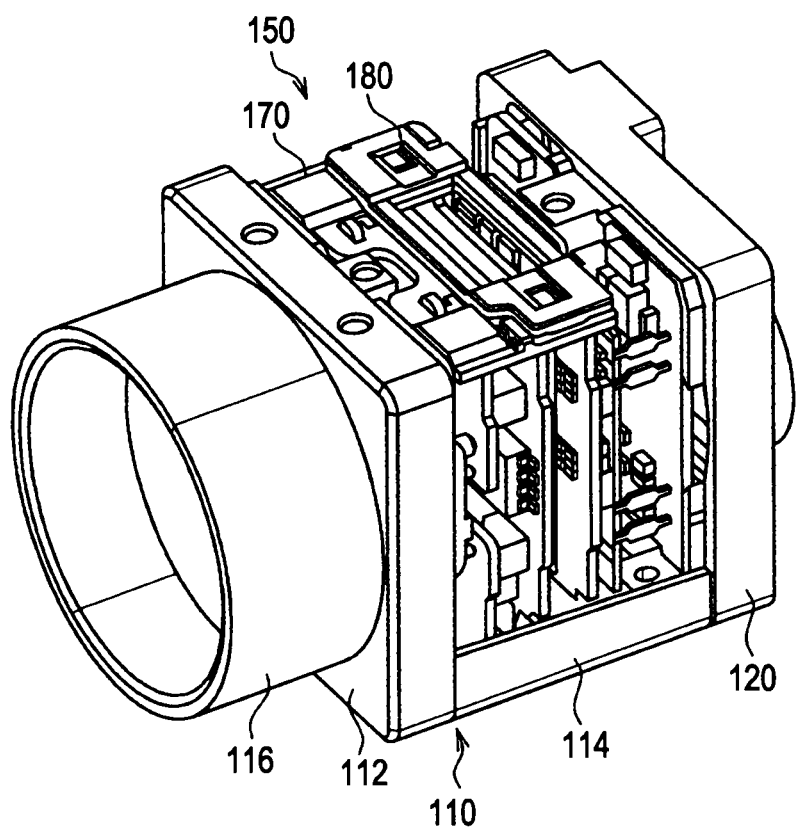
FIG. 2 is a perspective view of the image-acquisition device without an upper cover, schematically showing a state in which a front panel and a rear panel are fixed with a multilayer flexible substrate interposed therebetween.

As shown in FIG. 1, the image-acquisition device 100 is structured mainly from a front panel 110, a rear panel 120, and an upper case 130. The front panel 110 and the rear panel 120 are made of, for example, die casting aluminum. The upper case 130 is formed by bending an aluminum plate. The image-acquisition device 100 is formed such that the front panel 110 and the rear panel 120 are fixed by screws at abutted portions and the upper case 130 is fixed by screws so as to cover an open portion formed between the front panel 110 and the rear panel 120. Thus, a closed casing is structured in the image-acquisition device 100. A multilayer flexible substrate 150 is disposed in the open portion. FIG. 2 is a perspective view of the image-acquisition device 100 without the upper cover 130, showing a state in which the front panel 110 and the rear panel 120 are fixed with the multilayer flexible substrate 150 interposed therebetween.

The front panel 110 includes a panel portion 112 and a base portion 114 that extends from the panel portion 112 in a direction perpendicular thereto and is formed as a single part with the panel portion 112. The front panel 110 has a substantially L shape when viewed from a side surface thereof. The front panel 110 has a rectangular image acquisition opening penetrating the central portion thereof. A cylindrical lens-attaching portion 116 that allows various types of lens barrels to be attached by, for example, a C-mounting method is integrally formed on the outside surface, around the image acquisition opening.

Figure 3:
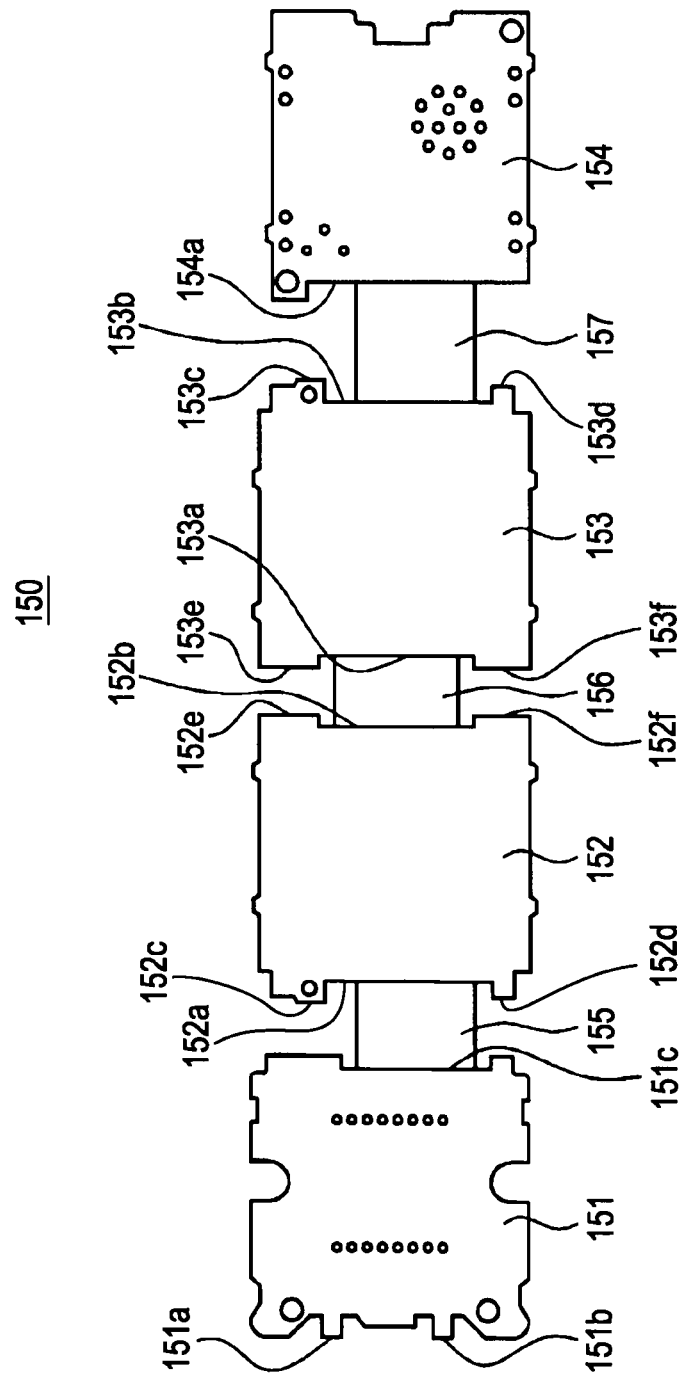
FIG. 3 is a plan view showing the structure of the multilayer flexible substrate.
Figure 4:
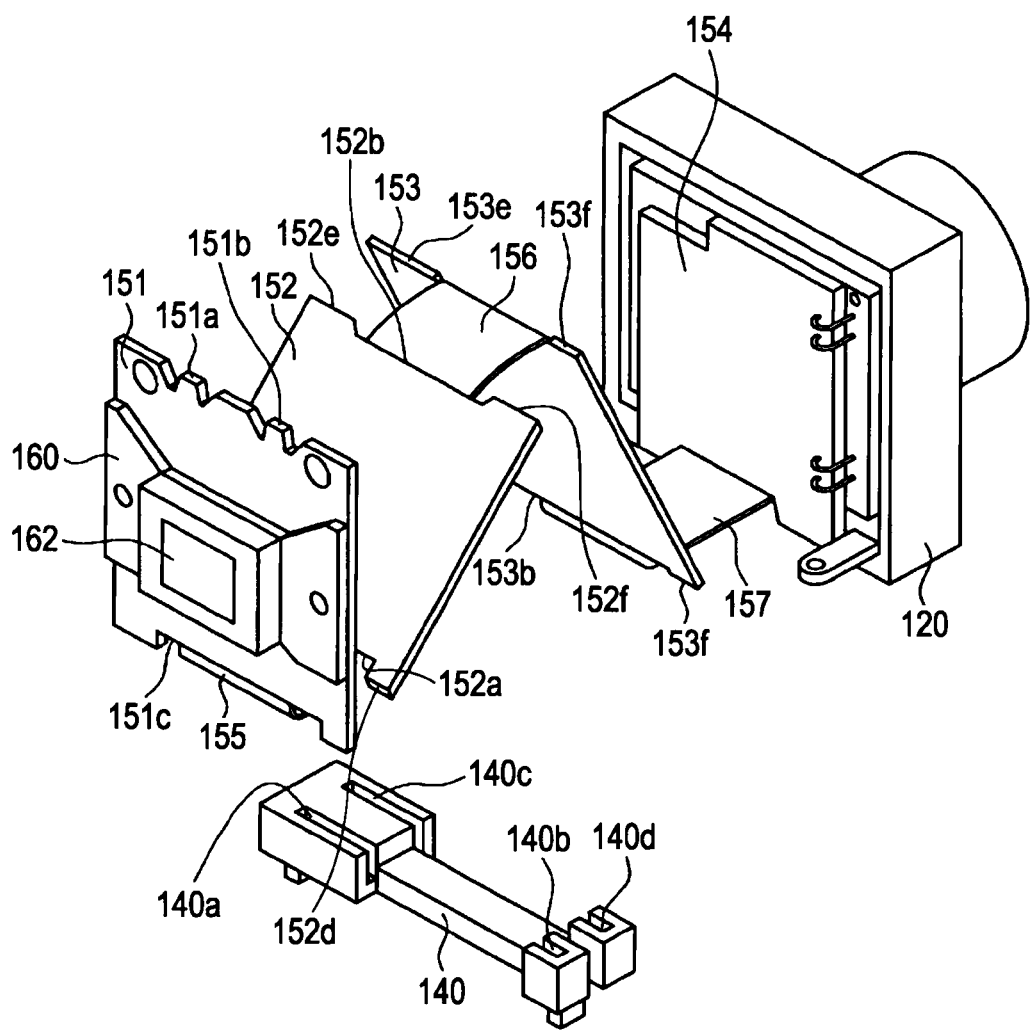
FIG. 4 is a perspective view of the multilayer flexible substrate bent at a first flexible cable portion, a second flexible cable portion, and a third flexible cable portion.

The multilayer flexible substrate 150 fixed to the front panel 110 and the rear panel 120 and positioned by a positioning member 140 is attached to the image-acquisition device 100. Referring to FIGS. 3 and 4, the structure of the multilayer flexible substrate 150 will be described.

2. The Structure of the Multilayer Flexible Substrate

FIG. 3 is a plan view showing the structure of the multilayer flexible substrate 150. FIG. 4 is a perspective view of the multilayer flexible substrate 150 bent at a flexible cable portion 155, a flexible cable portion 156, and a flexible cable portion 157 so as to be inserted between the front panel 110 and the rear panel 120.

As shown in FIGS. 3 and 4, the multilayer flexible substrate 150 includes four substrate portions, namely, a first substrate 151, a second substrate 152, a third substrate 153, and a fourth substrate 154. The four substrate portions of the multilayer flexible substrate 150 are connected together by the first flexible cable portion 155, the second flexible cable portion 156, and the third flexible cable portion 157. The substrate portions 151 to 154 of the multilayer flexible substrate 150 have an external shape that is slightly smaller than the external shapes of the panel portion 112 of the front panel 110 and the rear panel 120.

The substrate portions 151 to 154 of the multilayer flexible substrate 150 are each formed by stacking, for example, film materials formed of polyimide resin having predetermined circuit patterns of copper foil formed thereon in multiple layers. As shown in FIGS. 1 and 2, electronic components, such as chip components, are mounted on the front and rear main surfaces of the substrate portions 151 to 154. The flexible cable portions 155 to 157 are formed of flexible print substrates composed of, for example, polyimide resin.

As shown in FIG. 4, a charge-coupled device (CCD) image-acquisition-device unit 162 is attached to one of the main surfaces of the first substrate 151 via an attaching bracket 160. As shown in FIGS. 3 and 4, the first substrate 151 has a pair of engaging projections 151a and 151b provided at a distance from each other in the width direction and projecting from a side edge positioned on the upper side when stored in the casing. A substrate support member 170 (described below) is attached to the engaging projections 151a and 151b. The first substrate 151 has a recess 151c in a side edge positioned on the lower side when stored in the casing, and the first flexible cable portion 155 is led out of the recess 151c. The recess 151c serves as a run-off through which the first flexible cable portion 155 is led out toward the rear panel 120 side.

The CCD image-acquisition-device unit 162 is highly precisely positioned and attached to the attaching bracket 160, and the attaching bracket 160 is fixed to attachment bosses 112a formed on the panel portion 112 of the front panel 110 with screws. The first substrate 151 is mounted by inserting connection terminals of the CCD image-acquisition-device unit 162 into terminal holes and soldering them.

The first substrate 151 positioned with respect to the panel portion 112 of the front panel 110 is fixed by screws that are screwed into the attachment bosses 112a provided on the panel portion 112. The recess 151c in the first substrate 151 defines a space between itself and the base portion 114, and the first flexible cable portion 155 is bent and led toward the rear panel 120 side through the space.

As shown in FIG. 3, the first flexible cable portion 155 is led out of the side edge opposite the side edge having the engaging projections 151a and 151b. The second substrate 152 is connected to the first substrate 151 via the first flexible cable portion 155. The second substrate 152 has a recess 152a positioned on the lower side when stored in the casing. The recess 152a serves as a run-off through which the first flexible cable portion 155 is led out. On the other hand, the second flexible cable portion 156 is led out of the side edge opposite the recess 152a in the second substrate 152, i.e., the side edge positioned on the upper side when stored in the casing. A recess 152b, which serves as a run-off for the second flexible cable portion 156, is provided on the side edge opposite the recess 152a in the second substrate 152.

3. The Multilayer-Flexible-Substrate Support Structure at the Bottom of the Casing The positioning member 140 fixed onto the base portion 114 has, as shown in FIG. 4, in the top surface thereof, holding grooves 140a and 140b for receiving the second substrate 152 and holding grooves 140c and 140d for receiving the third substrate 153. The holding grooves 140a and 140b and the holding grooves 140c and 140d are formed parallel to each other.

The second substrate 152 has a pair of engaging projections 152c and 152d provided at a distance from each other in the width direction with the recess 152a therebetween. The first engaging projection 152c of the second substrate 152 is relatively engaged with the first holding groove 140a in the positioning member 140, and the second engaging projection 152d is relatively engaged with the second holding groove 140b. The second substrate 152 has a thickness substantially equal to the width of the holding grooves 140a and 140b in the positioning member 140. Accordingly, by inserting the engaging projections 152c and 152d of the second substrate 152 into the holding grooves 140a and 140b, the second substrate 152 is accurately positioned with respect to the positioning member 140.

Furthermore, the second substrate 152 has a pair of engaging projections 152e and 152f provided at a distance from each other in the width direction with the recess 152b therebetween. As will be described below, the engaging projections 152e and 152f are inserted into two engaging holes 174 in the substrate support member 170.

As shown in FIG. 3, the third substrate 153 is symmetric with the second substrate 152. The second flexible cable portion 156 is connected to the side edge of the third substrate 153, positioned on the upper side when stored in the casing, and the third substrate 153 is connected to the second substrate 152 via the second flexible cable portion 156. The third substrate 153 has a recess 153a in the side edge positioned on the upper side when stored in the casing. The recess 153a serves as a run-off through which the second flexible cable portion 156 is led out.

The third flexible cable portion 157 is led out of the side edge of the third substrate 153 positioned on the lower side when stored in the casing. The third substrate 153 has a recess 153b serving as a run-off for the third flexible cable portion 157 in this side edge. The third substrate 153 has a pair of engaging projections 153c and 153d provided at a distance from each other in the width direction with the recess 153b therebetween. As will be described below, the first engaging projection 153c of the third substrate 153 is relatively engaged with the third holding groove 140c of the positioning member 140, and the second engaging projection 153d is relatively engaged with the fourth holding groove 140d. The third substrate 153 also has a thickness substantially equal to the width of the holding grooves 140c and 140d in the positioning member 140. Accordingly, by inserting the engaging projections 153c and 153d of the third substrate 153 into the holding grooves 140c and 140d, the third substrate 153 is accurately positioned with respect to the positioning member 140.

Furthermore, the third substrate 153 has a pair of engaging projections 153e and 153f provided at a distance from each other in the width direction with the recess 153a therebetween. As will be described below, the engaging projections 153e and 153f are inserted into two engaging holes 176 in the substrate support member 170.

As shown in FIGS. 3 and 4, the third flexible cable portion 157 is connected to the side edge of the fourth substrate 154, positioned on the lower side when stored in the casing. The fourth substrate 154 is connected to the third substrate 153 via the third flexible cable portion 157. The fourth substrate 154 has a recess 154a in the side edge positioned on the lower side when stored in the casing. The recess 154a serves as a run-off through which the third flexible cable portion 157 is led out. The fourth substrate 154 is positioned and fixed to the surface of the rear panel 120 on the front panel 110 side.

As has been described above, in the image-acquisition device 100, the first substrate 151 and the fourth substrate 154, which are arranged at both ends of the multilayer flexible substrate 150, are positioned and fixed to the front panel 110 and the rear panel 120, respectively. Furthermore, in the image-acquisition device 100, the second substrate 152 and the third substrate 153, which are arranged in the middle of the multilayer flexible substrate 150, are positioned by the positioning member 140 fixed to the base portion 114.

As has been described above, in the multilayer flexible substrate 150, the first substrate 151 is made to face the second substrate 152 by bending the first flexible cable portion 155 while the first substrate 151 is positioned with respect to the front panel 110. The second substrate 152 is attached to the positioning member 140 such that it stands upright from the base portion 114 with the side edge having the recess 152a positioned on the lower side.

The second substrate 152 of the multilayer flexible substrate 150 is positioned on and attached to the base portion 114 via the positioning member 140. Then, as shown in FIG. 4, by bending the second flexible cable portion 156 along the recess 152b, the third substrate 153 is made to face the second substrate 152. As shown in FIG. 4, the third substrate 153 is attached to the positioning member 140 such that it stands upright from the base portion 114 with the side edge having the recess 153b positioned on the lower side. Thus, the third substrate 153 is attached to the base portion 114 via the positioning member 140 so as to be parallel to the second substrate 152.

After the above-described operations, the substrate portions 151 to 154 of the multilayer flexible substrate 150 are attached between the panel portion 112 of the front panel 110 and the rear panel 120 so as to be parallel to one another. The distance between the second substrate 152 and the third substrate 153 in the middle of the multilayer flexible substrate 150 is defined by the positioning member 140.

As has been described above, in the multilayer flexible substrate 150, the first substrate 151 faces the second substrate 152, and the second substrate 152 faces the third substrate 153. At the bottom of the multilayer flexible substrate 150, the distance between the second substrate 152 and the third substrate 153 is defined by the positioning member 140. Because the first substrate 151 is fixed to the panel portion 112 of the front panel 110, and the positioning member 140 that holds the second substrate 152 is fixed to a predetermined position on the base portion 114 of the front panel 110, the relative position of the first substrate 151 and the second substrate 152 is also defined.

4. The Multilayer-Flexible-Substrate Support Structure at the Top of the Casing

Next, the structure for supporting the multilayer flexible substrate 150 at the top of the casing will be described. As shown in FIG. 1, the substrate support member 170 and a cushion rubber member 180 are disposed on the multilayer flexible substrate 150. The substrate support member 170 is made of, for example, a resin material and defines, at the top of the casing, the distance between the first substrate 151 and the second substrate 152, as well as the distance between the second substrate 152 and the third substrate 153.

As shown in FIG. 1, the substrate support member 170 and the cushion rubber member 180 are disposed on the upper edges of the substrates 151, 152, and 153 of the multilayer flexible substrate 150 disposed between the front panel 110 and the rear panel 120.

Figure 5:
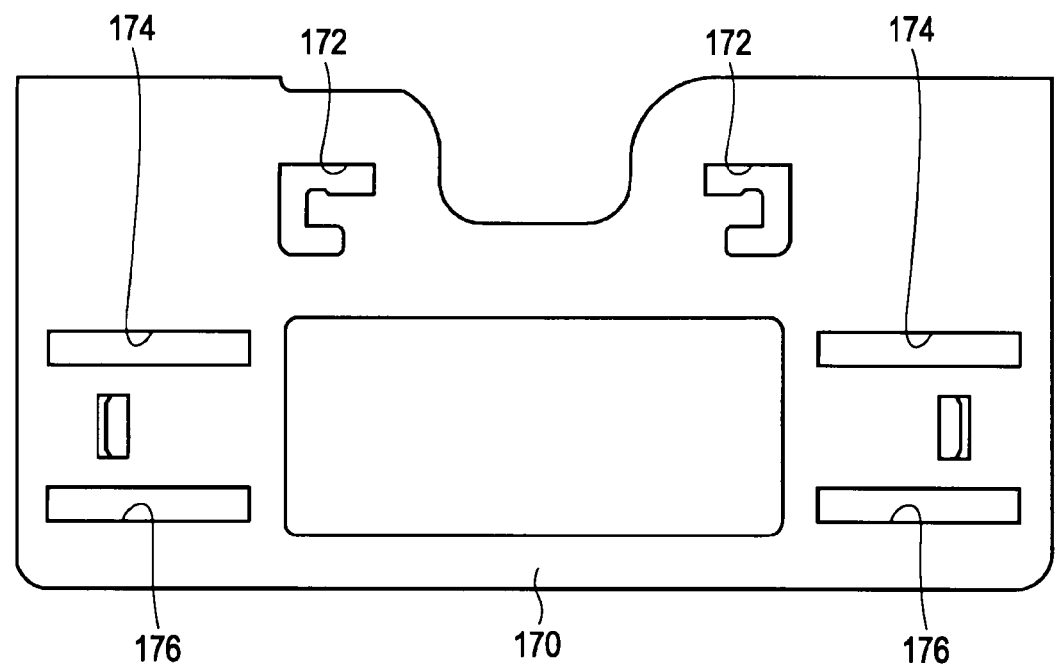
FIG. 5 is a schematic plan view showing the structure of a substrate support member, viewed from below in FIG. 1.

FIG. 5 is a schematic plan view showing the structure of the substrate support member 170, viewed from below in FIG. 1. As shown in FIGS. 1 and 5, the substrate support member 170 has penetrating engaging holes 172, 174, and 176. Two engaging holes 172 are provided at positions corresponding to the engaging projections 151a and 151b of the first substrate 151 of the multilayer flexible substrate 150 and receive the engaging projections 151a and 151b. As has been described above, because the first substrate 151 is fixed to the panel portion 112 of the front panel 110, the position of the substrate support member 170 is determined by receiving the engaging projections 151a and 151b.

Furthermore, two engaging holes 174 are provided at positions corresponding to the engaging projections 152e and 152f of the second substrate 152 of the multilayer flexible substrate 150 and receive the engaging projections 152e and 152f. By inserting the engaging projections 151a and 151b into the two engaging holes 172 and inserting the engaging projections 152e and 152f into the two engaging holes 174, the position of the second substrate 152 with respect to the first substrate 151 is determined at the top of the casing.

Furthermore, two engaging holes 176 are provided at positions corresponding to the engaging projections 153e and 153f of the third substrate 153 of the multilayer flexible substrate 150 and receive the engaging projections 153e and 153f. By inserting the engaging projections 152e and 152f into the two engaging holes 174 and inserting the engaging projections 153e and 153f into the two engaging holes 176, the position of the third substrate 153 with respect to the second substrate 152 is determined at the top of the casing.

As has been described above, by engaging the substrate support member 170 with the side edges of the substrates 151, 152, and 153 positioned on the upper side of the casing, the positions of the substrates 152 and 153, in particular, the positions of the substrates 152 and 153 in the perpendicular direction, can be determined at the top of the casing. Thus, the substrates 151, 152, and 153 can be securely supported by the positioning member 140 at the bottom of the casing and the substrate support member 170 at the top of the casing, and the distances between the substrates 151, 152, 153, and 154 can be accurately defined. Thus, the electronic components mounted on the substrates 151, 152, 153, and 154 can be prevented from interfering with one another and failures due to contact of the electronic components can be prevented.

Figure 6:
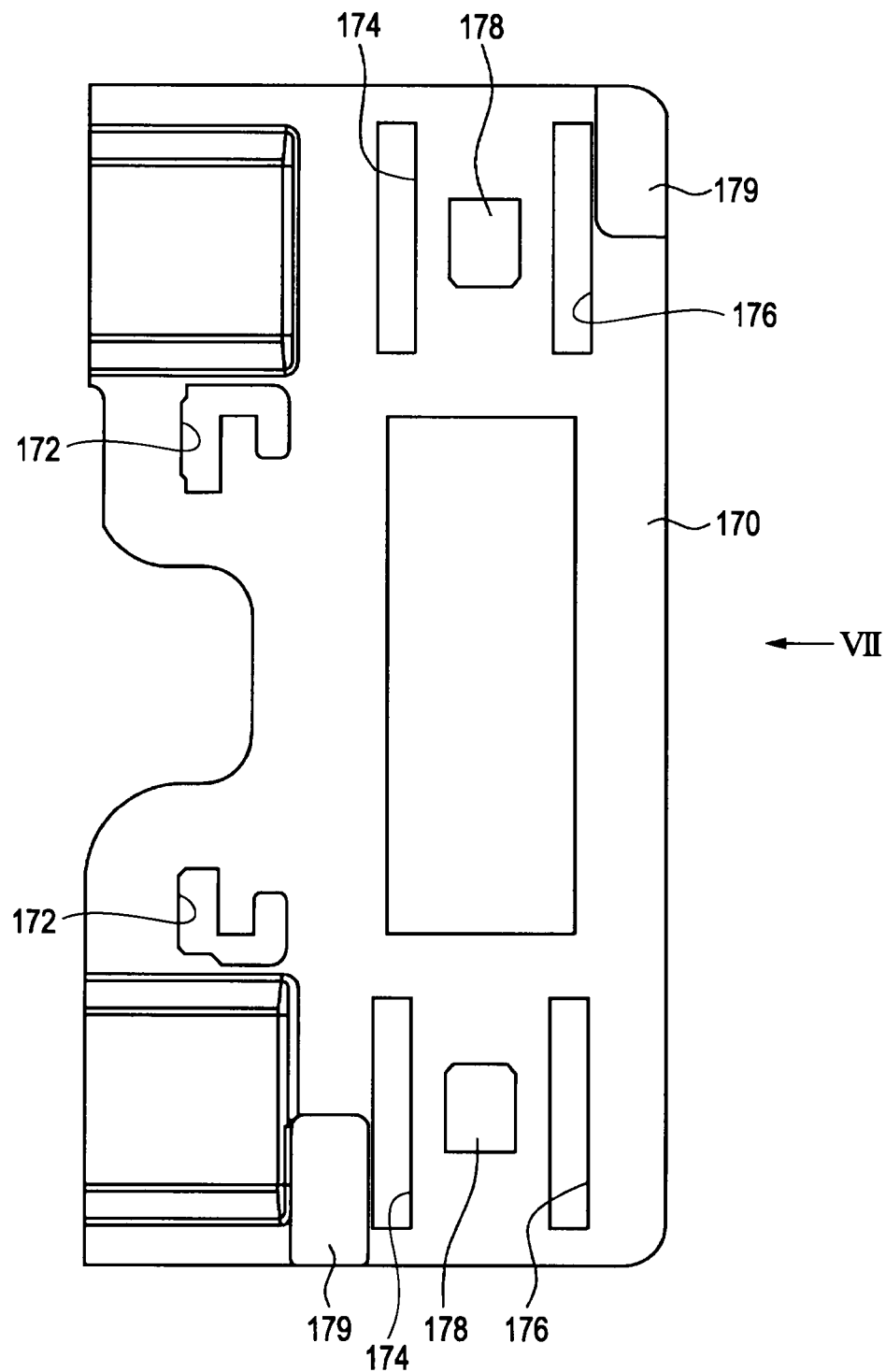
FIG. 6 is a schematic plan view showing the structure of the substrate support member, viewed from above in FIG. 1.
Figure 7:
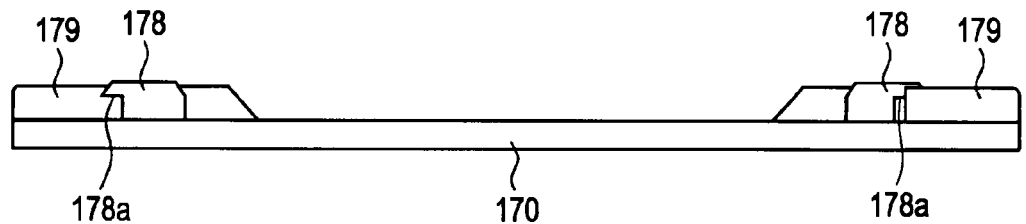
FIG. 7 is a schematic side view of the substrate support member.

FIG. 6 is a schematic plan view showing the structure of the substrate support member 170, viewed from above in FIG. 1. FIG. 7 is a schematic side view of the substrate support member 170, viewed from the direction of an arrow VII in FIG. 6. As shown in FIGS. 6 and 7, the top surface of the substrate support member 170 has two engaging hooks 178 to be engaged with the cushion rubber member 180. The top surface of the substrate support member 170 also has projections 179 for defining the orientation of the cushion rubber member 180.

Figure 8:
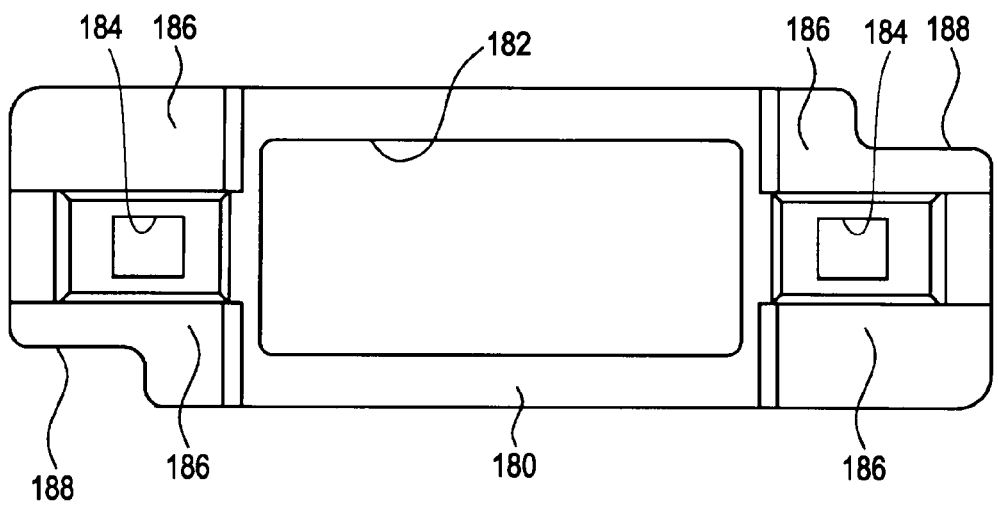
FIG. 8 is a plan view showing the structure of a cushion rubber member.
Figure 9:
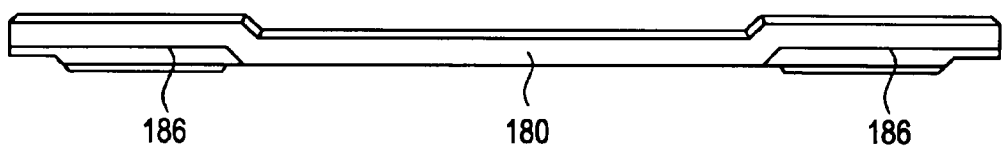
FIG. 9 is a schematic side view of the cushion rubber member.

The cushion rubber member 180 is fitted to the top surface of the substrate support member 170. The cushion rubber member 180 is made of, for example, an elastic material, such as silicon rubber. FIG. 8 is a plan view showing the structure of the cushion rubber member 180, viewed from below in FIG. 1. FIG. 9 is a schematic side view of the cushion rubber member 180. As shown in FIG. 8, the cushion rubber member 180 has a penetrating opening 182 in the middle thereof. The cushion rubber member 180 also has an engaging hole 184 on either side of the opening 182. Furthermore, as shown in FIGS. 8 and 9, the cushion rubber member 180 has abutting surfaces 186 to which the engaging projections 152e, 152f, 153e, and 153f projecting from the engaging holes 174 and 176 in the substrate support member are abutted.

Figure 10:
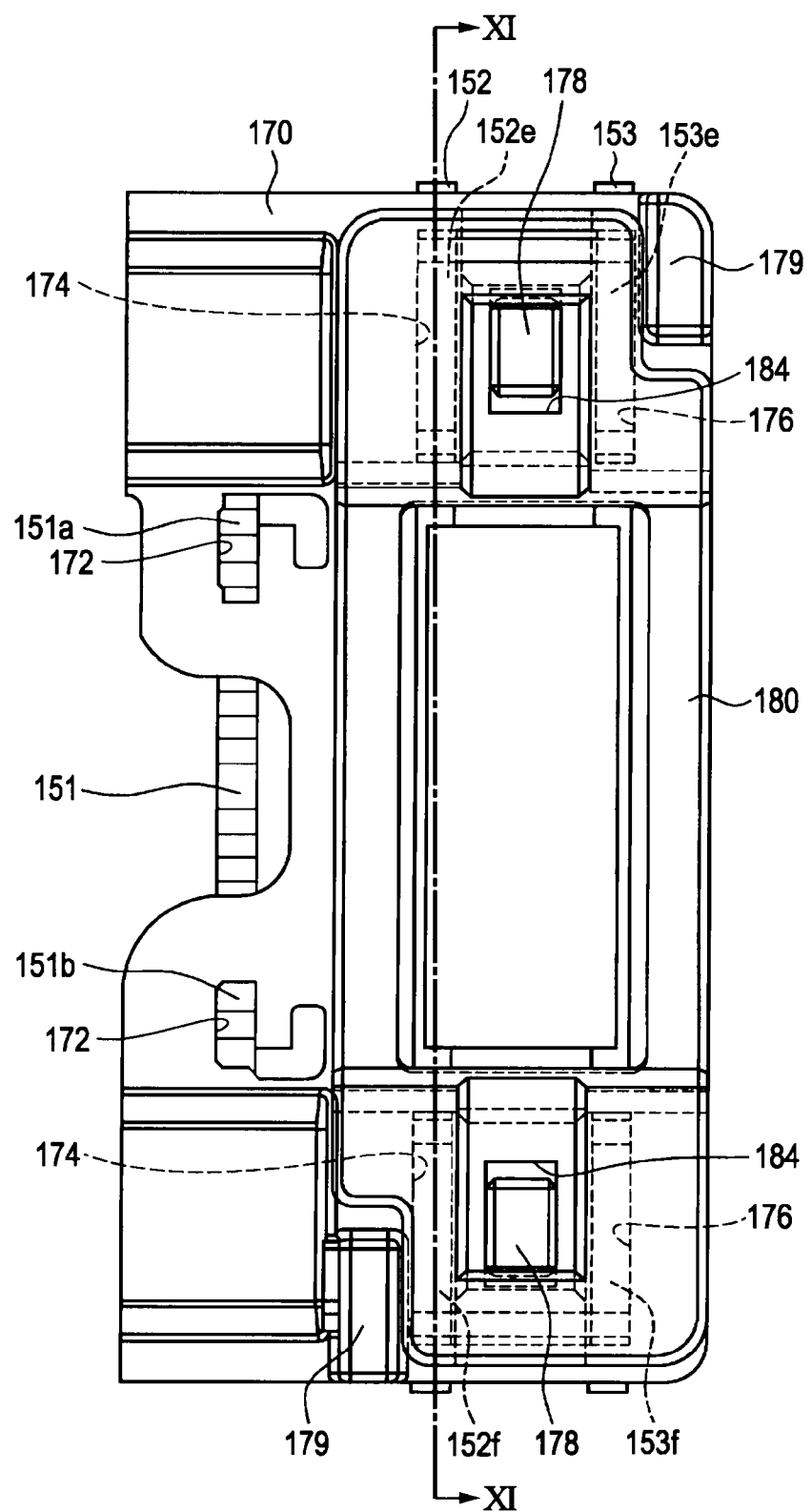
FIG. 10 is a schematic view showing a state in which the substrate support member and the cushion rubber member are attached to the upper edge of the multilayer flexible substrate.

FIG. 10 is a schematic view showing the casing shown in FIG. 2, viewed from above, showing a state in which the substrate support member 170 and the cushion rubber member 180 are attached to the upper edge of the multilayer flexible substrate 150. As shown in FIG. 10, the two engaging holes 184 in the cushion rubber member 180 receive the two engaging hooks 178 of the substrate support member 170. Then, the substrate support member 170 and the cushion rubber member 180 are assembled together by allowing engaging surfaces 178a on the lower side of the engaging hooks 178 shown in FIG. 7 to be abutted to the top surfaces of the edges of the engaging holes 184 in the cushion rubber member 180. By assembling the substrate support member 170 and the cushion rubber member 180, these members can be attached to the multilayer flexible substrate 150 in an assembled state, which eases the assembling of the components. Furthermore, by engaging the engaging hooks 178 with the edges of the engaging holes 184, they do not have to be welded or bonded. This can improve the ease of assembly and reduce the production costs.

When the cushion rubber member 180 is attached to the substrate support member 170, because the top surface of the substrate support member 170 has the projections 179 and the cushion rubber member 180 has notches 188 corresponding to the projections 179, it is possible to prevent attaching the cushion rubber member 180 upside down. Note that the structure for assembling the substrate support member 170 and the cushion rubber member 180 is not limited to the one described above. For example, engaging hooks provided on the cushion rubber member 180 side may be engaged with engaging holes provided in the substrate support member 170.

The substrate support member 170 and the cushion rubber member 180, in an assembled state, are attached to the upper edge of the multilayer flexible substrate 150. As shown in FIG. 10, the engaging projections 151a and 151b are inserted into the engaging holes 172 in the substrate support member 170 that is assembled to the cushion rubber member 180. The engaging projections 152e and 152f are inserted into the engaging holes 174, and the engaging projections 153e and 153f are inserted into the engaging holes 176. As shown in FIG. 10, in this state, the engaging holes 174 and the engaging holes 176 are covered by the cushion rubber member 180.

Figure 11:
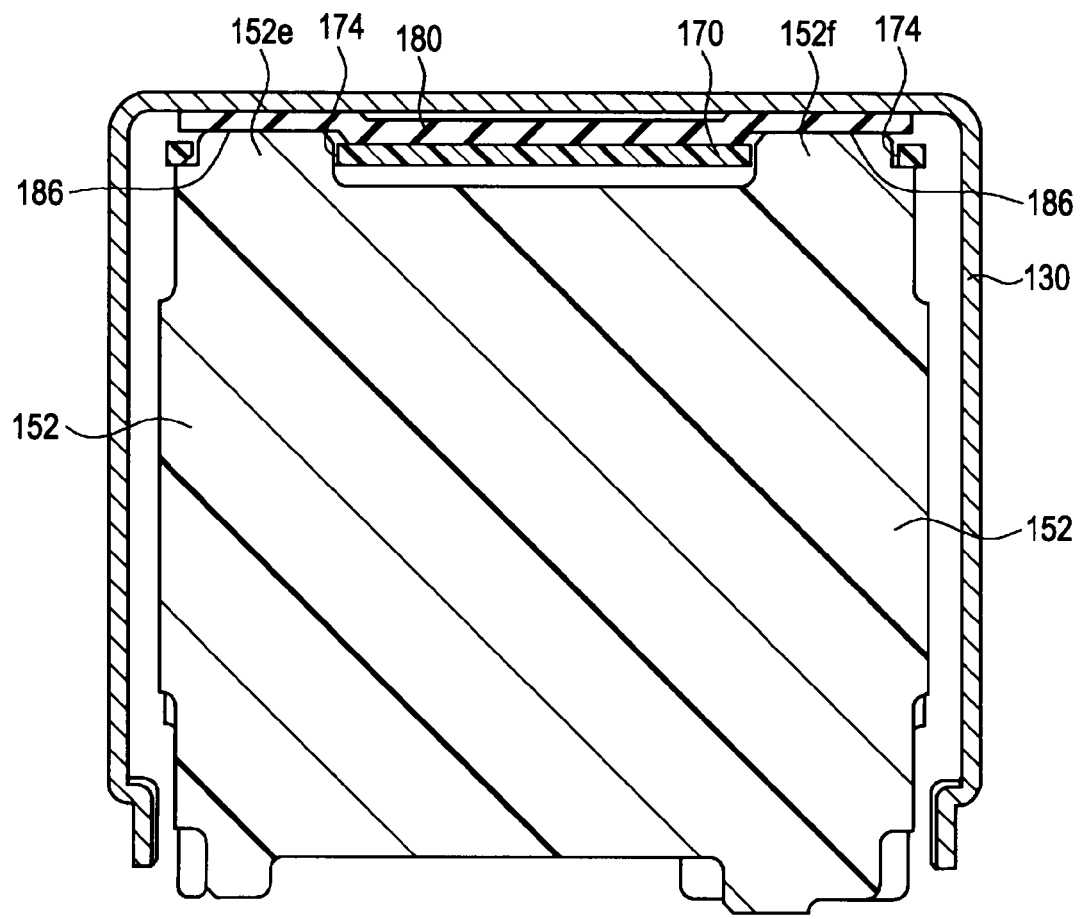
FIG. 11 is a schematic cross section taken along one-dot chain line XI-XI in FIG. 10, with an upper case.

Then, the upper case 130 is placed on the assembly shown in FIG. 10. Thus, the multilayer flexible substrate 150, the substrate support member 170, and the cushion rubber member 180 are covered by the upper case 130. FIG. 11 is a schematic cross section taken along one-dot chain line XI-XI in FIG. 10, with the upper case 130.

As shown in FIG. 11, the engaging projections 152e and 152f of the second substrate 152 are inserted into the engaging holes 174 in the substrate support member 170, and the top surfaces of the engaging projections 152e and 152f project upwards from the top surface of the substrate support member 170. Thus, the top surfaces of the engaging projections 152e and 152f are in contact with the bottom surface of the cushion rubber member 180.

On the other hand, the top surface of the cushion rubber member 180 is in contact with the bottom surface of the upper case 130. Therefore, the cushion rubber member 180 is elastically deformed between the bottom surface of the upper case 130 and the top surfaces of the engaging projections 152e and 152f, and the cushion rubber member 180 is pressed by a predetermined amount. At this time, the amount of deformation of the cushion rubber member 180 may be, for example, about 0.2 mm to 0.3 mm. Accordingly, the second substrate 152 is subjected to a downward force by the elasticity of the cushion rubber member 180 and is supported by being sandwiched between the upper case 130 and the positioning member 140.

Thus, in the direction perpendicular to the surface direction (the direction in which light is incident on the CCD image-acquisition-device unit 162), the second substrate 152 is held by the positioning member 140 and the substrate support member 170. Furthermore, in the surface direction (the top-bottom direction), the second substrate 152 is sandwiched between the upper case 130 and the positioning member 140 with the cushion rubber member 180 interposed between itself and the upper case 130.

The third substrate 153 is held in the same manner as the second substrate 152. The engaging projections 153e and 153f of the third substrate 153 are inserted into the engaging holes 176 in the substrate support member 170, and the top surfaces of the engaging projections 153e and 153f project upwards from the top surface of the substrate support member 170. Therefore, the top surfaces of the engaging projections 153e and 153f are in contact with the bottom surface of the cushion rubber member 180. The third substrate 153 is subjected to a downward force by the elasticity of the cushion rubber member 180 and is supported by being sandwiched between the upper case 130 and the positioning member 140.

As has been described above, if the upper edge of the multilayer flexible substrate 150 is held only by the cushion rubber member 180 without providing the substrate support member 170, it is difficult to accurately determine the positions of the substrates in the direction perpendicular to the surfaces of the substrates. This varies the distance between the substrates 151, 152, 153, and 154 in an assembly step, in which the multilayer flexible substrate 150 is disposed in the casing and the upper case 130 is placed thereon, which may result in interferences of the electronic components disposed on the substrates so as to face each other. Furthermore, if, in a state in which the electronic components interfere with one another, a large impact is applied to the image-acquisition device 100, a failure such as coming off of the electronic components from the substrates may occur.

In this embodiment, at the top of the casing, the substrate support member 170 is engaged with the first substrate 151 fixed to the front panel 110, and the second substrate 152 and the third substrate 153 are also engaged with the substrate support member 170. Therefore, the positions of the substrates 151, 152, and 153 in the direction perpendicular to the surface direction can be accurately defined. Regarding the top-bottom direction, because the engaging projections 152e, 152f, 153e, and 153f projecting from the engaging holes 174 and 176 in the substrate support member 170 elastically deform the cushion rubber member 180, the substrates 152 and 153 are sandwiched between the upper case 130 and the positioning member 140. Accordingly, the multilayer flexible substrate 150 can be securely held with the distances between the substrates 151, 152, 153, and 154 of the multilayer flexible substrate 150 being accurately maintained. Thus, even when an impact or vibration is applied to the image-acquisition device 100, the distances between the substrates 151, 152, 153, and 154 can be accurately maintained, and interferences of the electronic components disposed on the substrates 151, 152, 153, and 154 can be prevented. Furthermore, because the engaging projections 152e, 152f, 153e, and 153f are inserted into the engaging holes 172 and 174 in the substrate support member 170, the thickness of the substrate support member 170 can be sufficiently reduced compared to the case where the holding grooves are provided. Because the thickness of the cushion rubber member 180 can also be sufficiently reduced as long as a predetermined elasticity is obtained, the thicknesses of the substrate support member 170 and the cushion rubber member 180 can be reduced. This increases the space efficiency, and, as a result, achieves size reduction of the image-acquisition device 100.

As has been described above, according to this embodiment, the image-acquisition device 100 having the multilayer flexible substrate 150 includes the substrate support member 170 that defines the positions of the substrates in the perpendicular direction and the cushion rubber member 180 that supports the substrates in the surface direction with the elasticity. This enables the distances between the substrates constituting the multilayer flexible substrate 150 to be accurately maintained and the substrates to be securely supported.

The present application contains subject matter related to that disclosed in Japanese Priority Patent Application JP 2009-016011 filed in the Japan Patent Office on Jan. 27, 2009, the entire content of which is hereby incorporated by reference.

Although the preferred embodiment of the present invention has been described with reference to the attached drawings, the present invention is of course not limited to such an embodiment. It is clear that those skilled in the art can conceive variations and modifications within the scope of the claims, and such variations and modifications of course fall within the technical scope of the present invention.

What is claimed is:

1. A circuit-substrate support structure comprising:
   a circuit substrate having electronic components mounted thereon;
   a rear panel to which at least a portion of the circuit substrate is affixed;
   a first substrate-holding member provided to hold the circuit substrate at one side edge of the circuit substrate;
   a second substrate-holding member, separate from the rear panel, provided to hold another side edge of the circuit substrate, opposite the one side edge; and
   an elastic member, separate from the rear panel, provided at a side of the second substrate-holding member opposite the circuit substrate to hold the circuit substrate by applying elasticity in a surface direction of the circuit substrate.

2. The circuit-substrate support structure according to claim 1, wherein the second substrate-holding member has an engaging hole that receives the other side edge of the circuit substrate, and
   wherein the elastic member holds an end of the circuit substrate projecting from the engaging hole.

3. The circuit-substrate support structure according to claim 1, wherein the second substrate-holding member has an engaging portion to be engaged with the elastic member, and
   wherein the engaging portion couples the second substrate-holding member and the elastic member.

4. The circuit-substrate support structure according to claim 1, wherein the first substrate-holding member has a holding groove that receives the one side edge of the circuit substrate.

5. An image-acquisition device comprising:
   a multilayer substrate including a plurality of circuit substrates arranged to face one another;
   an image-acquisition unit mounted on a circuit substrate positioned at an end of the plurality of circuit substrates in a stacking direction to form an image of a subject;
   a first substrate-holding member provided at one side edge of the multilayer substrate to hold the plurality of circuit substrates;
   a rear panel to which at least one of the plurality of circuit substrates is affixed;
   a second substrate-holding member, separate from the rear panel, provided at another side edge of the multilayer substrate, opposite the one side edge, to hold the plurality of circuit substrates; and an elastic member, separate from the rear panel, provided at a side of the second substrate-holding member opposite the multilayer substrate to hold the plurality of circuit substrates by applying elasticity in a surface direction of the plurality of circuit substrates.

6. The image-acquisition device according to claim 5, wherein the second substrate-holding member has an engaging hole that receives side edges of the circuit substrates, and wherein the elastic member holds ends of the circuit substrates projecting from the engaging hole.

7. The image-acquisition device according to claim 5, wherein the second substrate-holding member has an engaging portion to be engaged with the elastic member, and wherein the engaging portion couples the second substrate-holding member and the elastic member.

8. The image-acquisition device according to claim 5, wherein the first substrate-holding member has holding grooves that receive the plurality of circuit substrates.

9. The circuit-substrate support structure according to claim 1, wherein the second substrate-holding member is disposed between the elastic member and the other side edge of the circuit substrate.

10. The circuit-substrate support structure according to claim 9, wherein the other side edge of the circuit substrate includes a plurality of engaging projections, and wherein the second substrate-holding member has a plurality of engaging holes for receiving the respective plurality of engaging projections.

11. The circuit-substrate support structure according to claim 10, wherein, when the plurality of engaging projections of the other side edge of the circuit substrate are inserted into the respective plurality of engaging holes of the second substrate-holding member, the circuit substrate is supported in a direction perpendicular to the surface direction.

12. The circuit-substrate support structure according to claim 11, wherein the engaging projections of the other side edge of the circuit substrate project through the second substrate-holding member, and wherein the engaging projections of the other side edge of the circuit substrate contact the elastic member.

13. The circuit-substrate support structure according to claim 12, wherein, when the engaging projections are in contact with the elastic member, the elastic member is elastically deformed so as to subject a downward force on to the engaging projections of the other side edge of the circuit substrate and sandwich the circuit substrate between the first substrate-holding member and the second substrate-holding member.

* * * * *